(12) United States Patent
Gallagher (10) Patent No.: US 8,351,920 B2
(45) Date of Patent: Jan. 8, 2013

(54) SYSTEM AND METHOD FOR FEMTOCELL MANAGEMENT

(75) Inventor: Mark Gallagher, Berkshire (GB)

(73) Assignee: SpiderCloud Wireless, Inc., San Jose, CA (US)

( * ) Notice: Subject to any disclaimer, the term of this patent is extended or adjusted under 35 U.S.C. 154(b) by 480 days.

(21) Appl. No.: 12/550,299

(22) Filed: Aug. 28, 2009

(65) Prior Publication Data

US 2010/0056132 A1    Mar. 4, 2010

Related U.S. Application Data

(60) Provisional application No. 61/095,099, filed on Sep. 8, 2008, provisional application No. 61/093,190, filed on Aug. 29, 2008.

(51) Int. Cl.
*H04W 4/00* (2009.01)

(52) U.S. Cl. ............ 455/422.1; 455/7; 455/9; 455/11.1; 455/420; 455/446; 455/447; 455/450; 455/452.1; 455/452.2; 455/522; 455/561; 370/328; 370/329; 370/330; 370/338

(58) Field of Classification Search ............... 455/422.1, 455/423, 424, 115.1, 115.2, 67.11, 69, 7, 455/9, 405, 408, 409, 450, 451, 452.1, 452.2, 11.1, 522, 561, 420, 445, 446, 447; 370/328, 329, 330, 338

See application file for complete search history.

(56) References Cited

U.S. PATENT DOCUMENTS

| | | | |
|---|---|---|---|
| 6,944,426 B1 * | 9/2005 | Esser et al. | 455/62 |
| 7,613,444 B2 * | 11/2009 | Lindqvist et al. | 455/403 |
| 8,144,725 B2 * | 3/2012 | Bienas et al. | 370/449 |
| 2009/0092078 A1 * | 4/2009 | Czaja et al. | 370/328 |
| 2009/0253421 A1 * | 10/2009 | Camp et al. | 455/418 |
| 2009/0262703 A1 * | 10/2009 | Khetawat et al. | 370/331 |
| 2009/0305671 A1 * | 12/2009 | Luft et al. | 455/411 |
| 2010/0027694 A1 * | 2/2010 | Touboul et al. | 375/260 |
| 2010/0056184 A1 * | 3/2010 | Vakil et al. | 455/456.5 |

* cited by examiner

*Primary Examiner* — Olumide T Ajibade Akonai
(74) *Attorney, Agent, or Firm* — AlbertDhand LLP (57) ABSTRACT

The present invention provides a method of operating a femtocell control module in control of a femtocell, comprising transmitting a request to operate the femtocell to an external control system; receiving a response from the external control system, where the response comprises an operational constraint on the femtocell; and causing the femtocell to conduct cellular communications according to the operational constraint.

30 Claims, 8 Drawing Sheets

SYSTEM AND METHOD FOR FEMTOCELL MANAGEMENT

CROSS-REFERENCE TO RELATED APPLICATIONS

This application claims the benefit of both U.S. Provisional Application No. 61/095,099 filed Sep. 8, 2008 and U.S. Provisional Application No. 61/093,190 filed Aug. 29, 2008, each of which is hereby incorporated herein by reference.

TECHNICAL FIELD

The present invention relates generally to communication networks, and more particularly, some embodiments relate to femtocell network-management.

DESCRIPTION OF THE RELATED ART

The deployment and usage of licensed spectrum cellular systems is common by wireless carriers and generate substantial telecommunication revenues. These systems are normally deployed over a wide geographic area. Various techniques, such as repeats and cell-splits, are often used for covering hard to reach places. However, these techniques are often insufficient to provide sufficient coverage for some cellular application. Accordingly, femtocells are sometimes deployed to provide licensed spectrum cellular systems within tight geographic bounds, potentially covering a space as small as part of a room within a building, but more normally a small dwelling or business.

These femtocells are typically designed to provide service areas of 100-1000 $m^2$ while macro-cells are normally sited to cover large geographic areas on the order of 10-100 $km^2$, micro-cells cover 1-10 $km^2$ and picocells cover 10,000-100,000 $m^2$ Licensed spectrum femtocells are usually designed to utilize a similar air-interface (base-station to handset) as the external macro-cell network so that the vast majority of devices can be used without any change.

Although femtocells allow efficient coverage of hard-to-cover locations, due to their smaller ranges their use in large scale coverage will often involve more cell sites. This level of scalability may exceed current normal operational bounds and standards since existing system or architecture may have the predefined limits on the number of cells that may be greatly exceeded by deployment of a femtocell system. Furthermore, the coexistence of multiple femtocells or femtocells along with other cellular systems can cause interference and handset registration difficulties.

BRIEF SUMMARY OF EMBODIMENTS OF THE INVENTION

The present application describes methods and apparatus for managing or providing security in a communications system comprising at least one wireless communications cell. For example, the methods and apparatus may be used in systems that include a plurality of femtocells that use a licensed spectrum and co-exist with base stations managed directly by the licensed spectrum holder.

In some embodiments, a control element, such as a switch controller or an access router is used to control a cell configuration, such as a plurality of femtocells or a femtocell and other network elements. In further embodiments, the control element can be co-located with a femtocell, be part of a femtocell, or be coupled to a femtocell by a communications link. In some embodiments, there are fewer control elements than femtocells or a femtocell with an integrated control unit may act as a control element to femtocells lacking control units.

In various embodiments, the control element may coupled to other network elements such as a security server controlled by the licensed spectrum holder. In these embodiments, the connection to the security server may be over a secure communications channel, such as a fiber communications channel, wired communications channel or a secure wireless communications channel. In these embodiments, increased security may be provided by requiring one or more devices in the system to register with the license spectrum holder, for example through the security server. This registration may further allow the femtocells to receive authorization for wireless transmissions prior to initiating communications activities. In some embodiments, during this registration or authorization process, the location or one or more planned femtocell transmission parameters, such as maximum transmission power levels or available frequencies, may be communicated to the licensed spectrum holder. In further embodiments, the parameters may communicate the location of the femtocell and its transmission parameters, such as the direction of one or more antennae. In these embodiments, different transmission parameters may be communicated for each antenna or antenna direction.

In some embodiments, the licensed spectrum holder has the ability to review the received information, perform device authentication, and respond to requests for initiation of femtocell communication activities in the indicated region. In addition to authorizing the transmission by the femtocells, the licensed spectrum holder may provide various transmission parameters or specify various constraints within which the femtocells must operate. For example, maximum transmission power constraints may be communicated, the frequency band or bands in which the femtocells may transmit may also be communicated. In further embodiments, different sets of parameters or transmission constraints may be sent for each femtocell transmitter.

In these embodiments, the licensed spectrum holder or other system controller is able to manage interference. For example, the various constraints may be imposed by the licensed spectrum holder, such that the local femtocell system can self-configure or be configured by a local administrator to optimize local coverage and load balancing without the need for the licensed spectrum holder to manage the particular implementation details. In further embodiments, the local femtocell system can be required to periodically request authorization or re-authorization to continue transmitting. Additionally, authorization to transmit within a set of constraints provided by the licensed spectrum holder may be for a limited period of time, e.g., a specified lease time, after which the femtocell is required to cease transmitting if the lease is not renewed.

In some embodiments, as part of a re-authorization request, the licensed spectrum holder may receive femtocell loading information, transmission power level information, or location and antenna directive information which may reflect local conditions or optimization which was performed since the last request for authorization to transmit. Requests to change the constraints upon which the femtocell or cells are required to operate may also be included in the request for authorization to continue transmitting. The licensed spectrum provider may adjust the transmission constraints, e.g., power levels or frequencies, which it authorizes the femtocells to use taking into consideration base station loading conditions, detected interference levels as well as the information and events corresponding to the femtocells that were reported in the request for transmission authorization. In addition, loading or interference to nearby base stations may also be taken into consideration.

In these embodiments, as conditions vary, the licensed spectrum holder can vary the constraints within which the femtocells are required to operate. If excessive base station loading or other conditions are detected, e.g., the addition or removal of a base station from the spectrum holder's network, the spectrum holder may communicate new transmission or operation constraints to the femtocell control unit. This communication may occur as part of a response to request to continue transmitting or may be sent, for example, by the spectrum holder's system in response to a need or change relating to one or more network components (e.g., base stations) of a network managed by the licensed spectrum holder.

In some embodiments, a security feature exists where femtocells self-police and stop further transmissions if they do not receive reauthorization. This may both free up the licensed spectrum for use by authorized base stations and eliminate a potential point of entry for an adversary to compromise the cellular system.

In some embodiments, the licensed spectrum holder can rapidly vary the constraints placed on the femtocell operation to reflect changes in the licensed spectrum holder's network or loading of base stations in the region in which the femtocells are deployed. The local femtocell deployment may respond to changes in transmission constraints imposed by the spectrum license holder by automatically reconfiguring itself (e.g., changing maximum transmission power levels or antenna pattern directivity in response to changes in the transmission constraints imposed by the licensed spectrum provider). In the described manner, both the licensed spectrum holder and femtocell administrator or control system are provided appropriate and optionally time varying levels of control.

According to an embodiment of the invention a method of operating a femtocell control module in control of a femtocell comprises transmitting a request to operate the femtocell to an external control system; receiving a response from the external control system, where the response comprises an operational constraint on the femtocell; and causing the femtocell to conduct cellular communications according to the operational constraint.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

The present invention provides a method of operating a femtocell control module in control of a femtocell, comprising transmitting a request to operate the femtocell to an external control system; receiving a response from the external control system, where the response comprises an operational constraint on the femtocell; and causing the femtocell to conduct cellular communications according to the operational constraint.

Before describing the invention in detail, it is useful to describe an example environment with which the invention can be implemented. One such example is that of a plurality of femtocells providing coverage to an area and connected to an authorization system through the Internet. In various embodiments, a system architecture is provided that be used in contemporary 2G and 3G licensed spectrum cellular systems, for example GSM, EDGE, WCDMA, HSPA, CDMA or 4G systems, e.g. WiMAX/LTE. In many embodiments, the available spectrum for use by mobile user equipment within a cellular system (the "licensed spectrum") may be apportioned in various manners. For example, in a cellular systems employing frequency division multiple access, methods may be provided for access stations to determine which user equipment are assigned which frequencies. A femtocell may be given a portion of such frequencies to assigned to connected user equipment by a spectrum manager, thereby allowing the femtocell to coexist with another femtocell that is given a different portion of the available frequencies. Other transmission characteristics given to the femtocell may also be under control of a cellular system manager. For example, these characteristics might comprise the transmission power of a femtocell, the amount of time in which the femtocell can operate, and which antennae can operate in a multi-antennae femtocell. Furthermore, any authorization to operate under any operational characteristics might be given for a temporary or permanent amount of time.

From time to time, the term "lease" is used herein to describe the permission given to a femtocell by a cellular system manager, such as a spectrum owner or their proxy, to operate under any operational characters. As examples, a lease might comprise the authorization to transmit at full power and at full spectrum for a predetermined amount of time, or a lease might comprise authorization at half power using a portion of the available spectrum for an unlimited amount of time . . . . Unlike other systems where a cell site or system is allowed usage indefinitely or for the period covering say an event, some embodiments described herein allow lease to be tied to the actual spectrum (e.g. frequency/channel) by both usage and time plus. In further embodiments, spectrum usage may be controlled or alternatively limited based on, a parameter used for optimal engineering for maximum capacity/coverage, a parameter used for minimized interference and a control parameter used as a override. The system described herein can be a unidirectional or a two-way system. Some embodiments have leases that may be monitored constantly or on a regular basis to check that they meet or exceed the system owners conditions of use and may be location or sub-location dependent.

Figure 1:
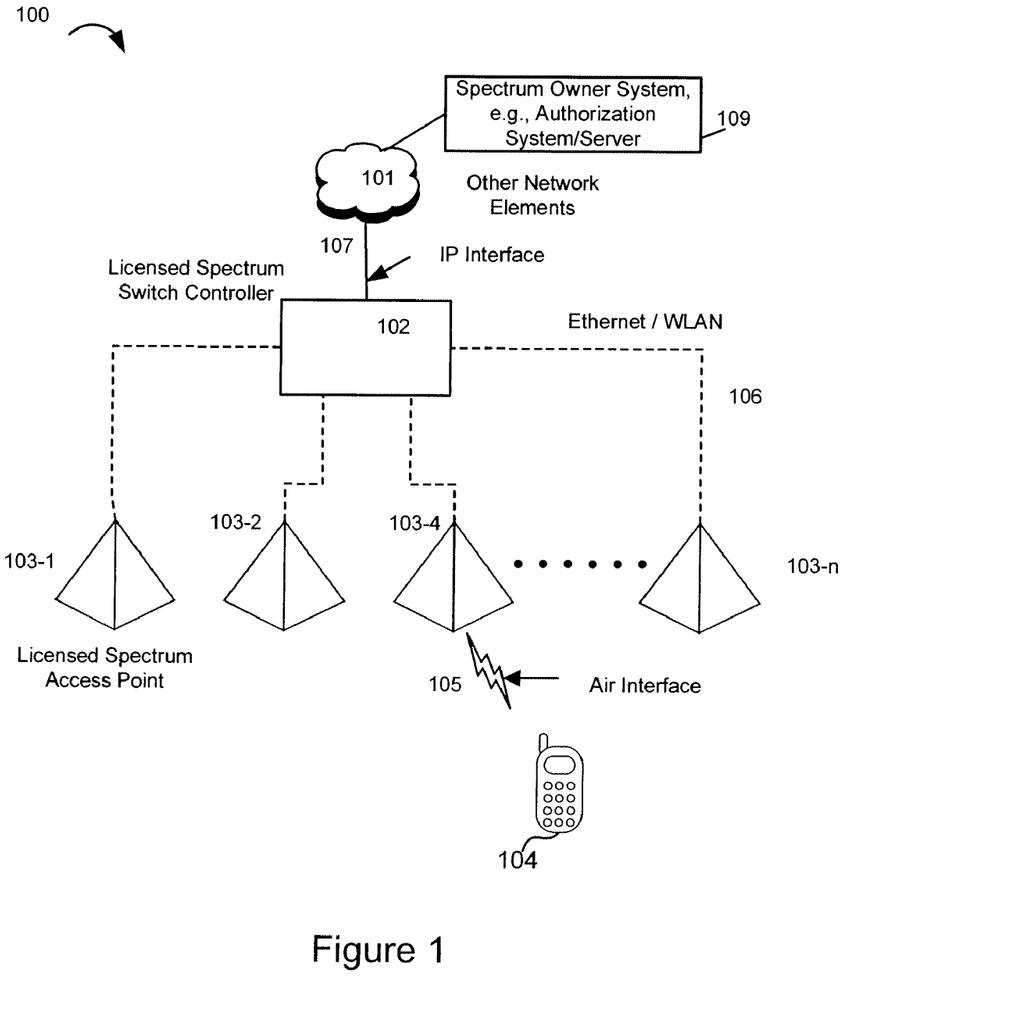
FIG. 1 illustrates the deployment of a system in accordance with embodiments of the invention.

For example, FIG. 1A illustrates an exemplary femtocell system 100 deployed in such an environment. As illustrated, system 100 comprises one or more femtocells, a switch controller, and an authorization system in communication over various network communication channels. In this embodiment, a core network infrastructure 101 comprises the medium through which the femtocells 103 communicate with the authorization system 109. In varying embodiments, infrastructure 101 may further comprise many different subsystems such as HLR (home location register), soft-switches, media gateways, routers, and database servers.

In this embodiment, an Internet protocol (IP) interface 107 provides a connection between a controller 102 and the network infrastructure 101. This connection allows communication between controller 102 and authorization system 109. In some embodiments, authorization system 109 might comprise, for example, a dedicated server configured to control the femtocell deployment in various locations, or might comprise a general headquarters for apportioning the cellular communication spectrum among coexisting cellular system. Controller 102 may comprise for example, a femtocell or licensed spectrum switch controller. In various embodiments, controller 102 may be configured to provide various deployment functions such as an aggregation function to hide network complexity, mobility manager, security proxy etc. Controller 102 may be further configured to connect to one or more femtocells 103 a network connection 106. For example, network section 106 may comprise a standards defined Ethernet-based connection that is agnostic to the chosen connection protocol, or a connection that uses Ethernet within its design for connection.

In further embodiments, controller 102 is in communication with and in control over one or more licensed spectrum access point femtocells 103. In these embodiments, the femtocells comprise an intent used to radiate and receive cellular phone signals, such as licensed spectrum signals over air interface 105. In some embodiments, air interface 105 may be defined by various protocols and modulation schemes, for example using standards-based MAC and PHY protocols. In this embodiment, the femtocells 103 provide a coverage area for user equipment 104 to connect to the mobile phone system over interface 105. User equipment 104 might comprise, for example, a standard mobile telephone or a "smart-phone" or PDA device that can receive data, voice, and text (for example short message services (SMS)) communications.

Some embodiments relate to the use of licensed spectrum owned by a third party where the rights to use this spectrum are governed by national and international laws and regulations. In some embodiments, the use of spectrum can be monitored on the broadcast link (system to mobile device), while in others the system is monitored on the uplink (mobile device to system).

In many embodiments, coverage of a large indoor area serving many people will necessitate a plurality of femtocells. Furthermore, due to constraints on femtocell placement, these femtocells may be located so that they have overlapping coverage areas. For example, this may occur if the femtocells are distributed somewhat haphazardly throughout a large open space, or throughout a building having a number of different sized rooms. Accordingly, in some embodiments a spectrum owner may shut off usage on a priority, needs or planned outage basis. For example, the priority could be based on national regulation (e.g. national emergency) or if the spectrum owner has been reallocated channels within that dedicated spectrum. Similarly, the spectrum owner may have a desire to minimize interference with the rest of the spectrum deployed elsewhere.

From time-to-time, the present invention is described herein in terms of these example environments. Description in terms of these environments is provided to allow the various features and embodiments of the invention to be portrayed in the context of an exemplary application. For example, the architecture described herein can be extended to pico, micro or macro-cell systems. After reading this description, it will become apparent to one of ordinary skill in the art how the invention can be implemented in different and alternative environments.

Figure 2:
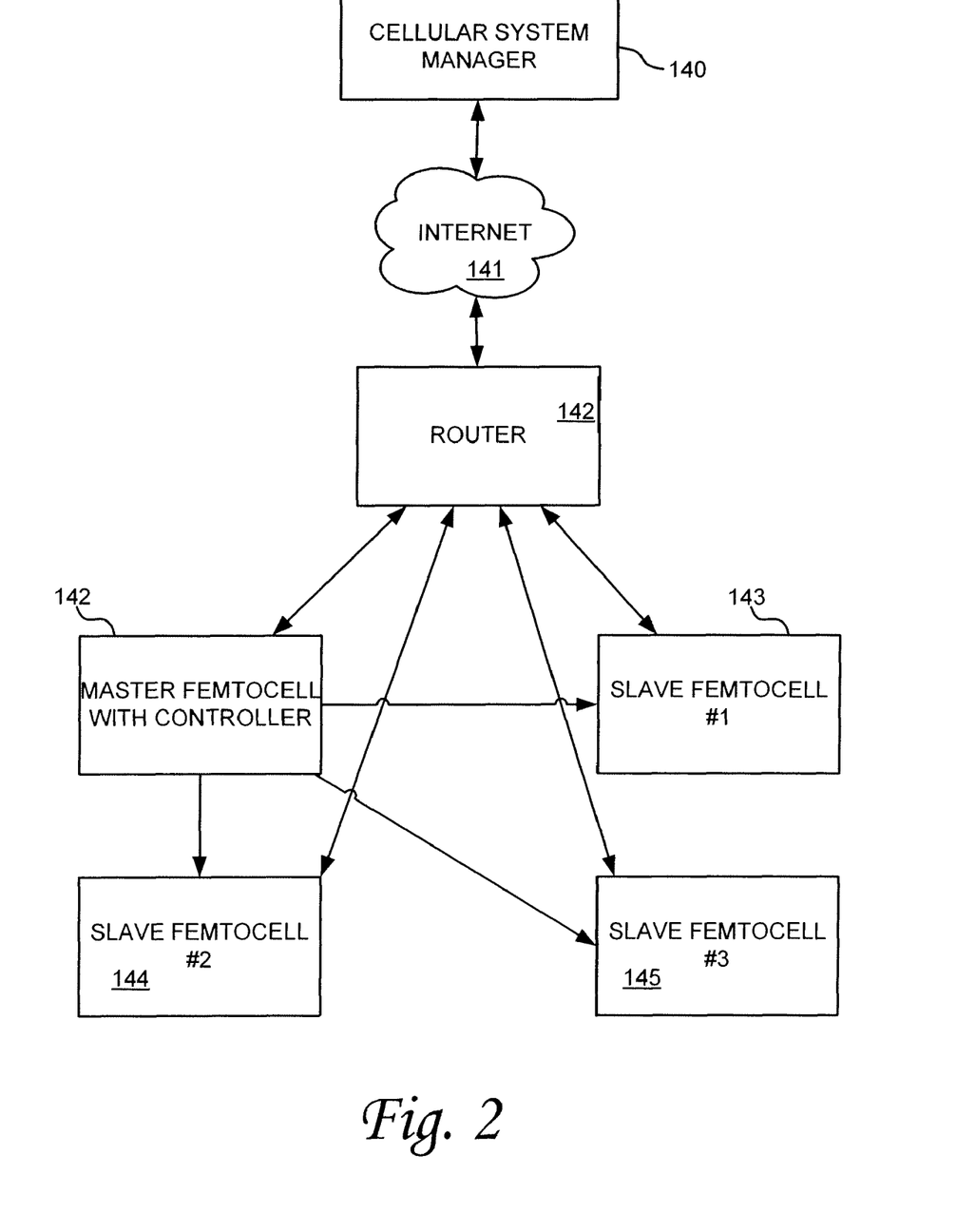
FIG. 2 illustrates a system architecture according to an embodiment of the invention.

FIG. 2 illustrates an example of a femtocell control system according to an embodiment of the invention. In this embodiment a plurality of femtocells 142, 143:44, and 145 are distributed to provide cellular phone coverage throughout a coverage area. The plurality of femtocells comprises a master femtocell 142 and a plurality of slave femtocells 143, 144, and 145. In this embodiment, the master femtocell 142 is in communication with the slave femtocells and is configured to be able to control the operational parameters of the slave femtocells. The femtocells are further in communication with a cellular system 140 via the Internet 141 and a router 142.

In some embodiments, the master femtocell 142 is in communication with cellular system manager 140 and is configured to send and receive lease requests for itself and its slave femtocells 143, 144, and 145. In various embodiments, sending the request for leases may comprise transmitting information about itself and the slave femtocells within its control, such as physical location, interference statistics in those locations, available transmit power, and the spectrum portions with which the femtocells can communicate. Accordingly, the cellular system manager 140 can use this information to determine what lease types should be given to the femtocells. For example, the cellular system manager 140 may transmit a lease to master femtocell 142 that instructs its transmission behavior and provides instructions as to the slave femtocells transmission behaviors. In these embodiments, the slave femtocells 143, 144, and 145 may comprise standard femtocell access points and may be unable to self-police in the manner required to carry out the instructions contained in a lease. Accordingly, the master femtocell 142 may be configured to control the operational behaviors of the slave femtocells 143, 144, and 145, such that the slaves 143, 144, and 145 conform to the lease parameters.

Figure 3:
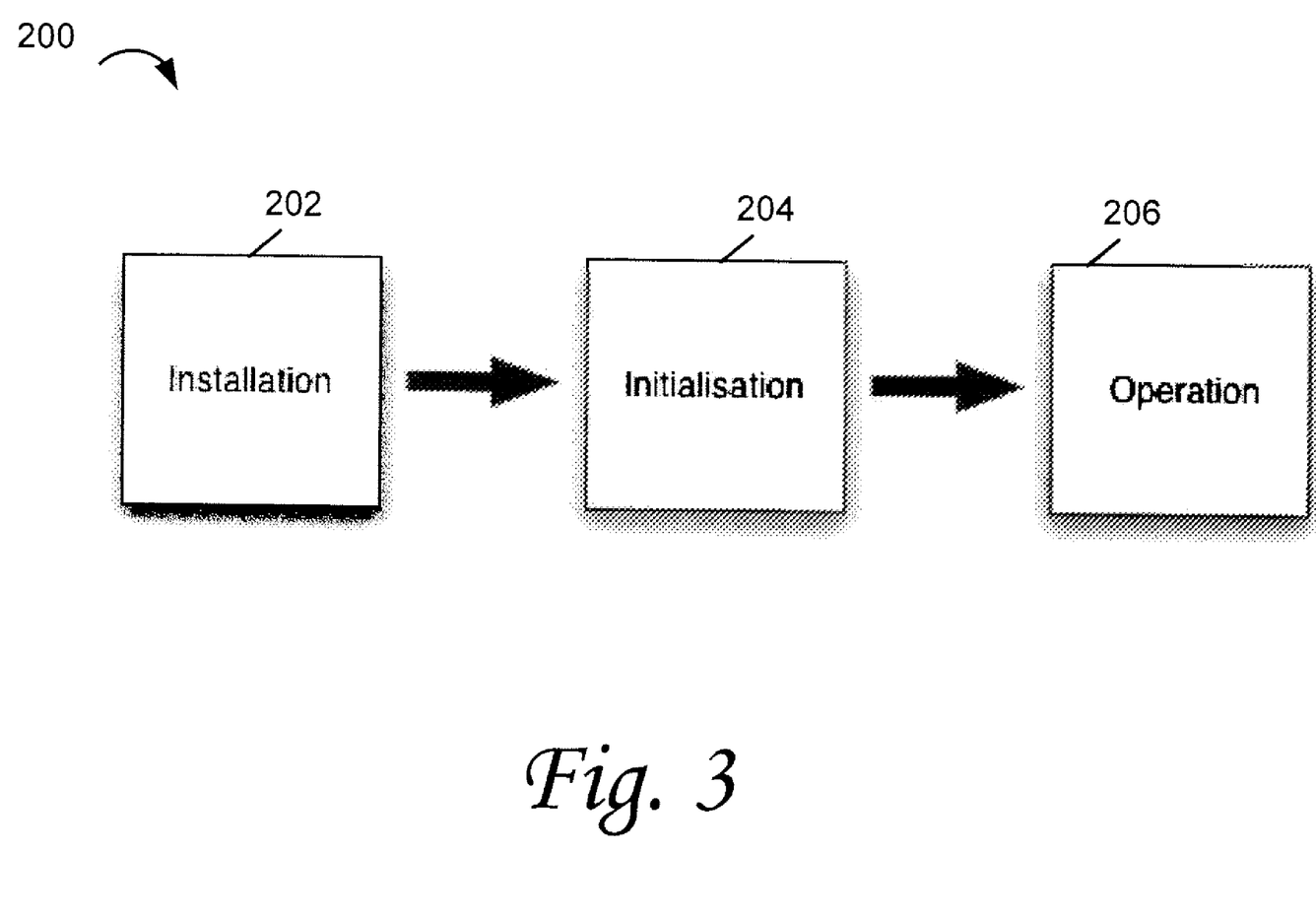
FIG. 3 illustrates security architectures for various embodiments of the invention.

FIG. 3 illustrates security architectures for various embodiments of the invention. In some embodiments, multiple levels of security may be provided at various stages of normal operation. For example, an initial security stage may be applied during installation of the system. For example, physically securing a femtocell and a controller during physical installation 202 may prevent physical access to the femtocells by an adversary. Furthermore, a femtocell or a controller described herein may comprise security features that can only be modified or initialized by physical access to the femtocell or controller, such as a password that must be manually input. Accordingly, preventing an adversary from physically accessing the femtocells further prevents the adversary from modifying these security features. Consideration of future usage during a physical installation of multiple femtocells and one or more controllers may allow a significant amount of local femtocell management, for example by a third-party purchaser of the femtocell, without compromising these security features. For example, a local entity may be able to decide coverage location and available redundancy, without providing physical access to a channel that communicates with the cellular system. For example, placing multiple femtocells in the nearby locations may allow the system to accommodate additional load. However, because of these multiple femtocells may be under control of a system controller, whether the additional femtocells are actually activated depends on the system manager. Accordingly, this prevents an adversary from activating a redundant femtocell and thereby utilizing an unsupervised channel for access to the cellular system.

In further embodiments, a second stage 204 of the security architecture is employed during the system initialization. This stage covers the processes used to correctly initialize the system so that it can successfully operate. The initialization stage is flexible to allow reasonable installation taking place and various parameters that may or may not have been entered or entered correctly. In some embodiments, the initialization stage allows a further level of security by allowing the user or installer to input proper authorization data prior to operation. This gives the cellular system manager the opportunity to verify this authorization data prior to network operation and, consequently prior to providing the femtocell with full access to the cellular network. In various embodiments, the initialization processes is able to be automatic, semi-automatic or manual as required by the end-user.

In further embodiments, an operation stage 206 provides a further level of security. For example, as described herein operation may comprise obtaining releases to operate according to various operational parameters. This allows the femtocells with self-policing programming to be able to disable themselves if the cellular system manager so indicates. In additional embodiments, the control processes may be undergone by external controllers, such as a master femtocell or a switch/router with a control module built-in. In these embodiments, even if an adversary were to force a femtocell to break its lease, the control system could still prevent network access by the compromised femtocell.

Figure 4:
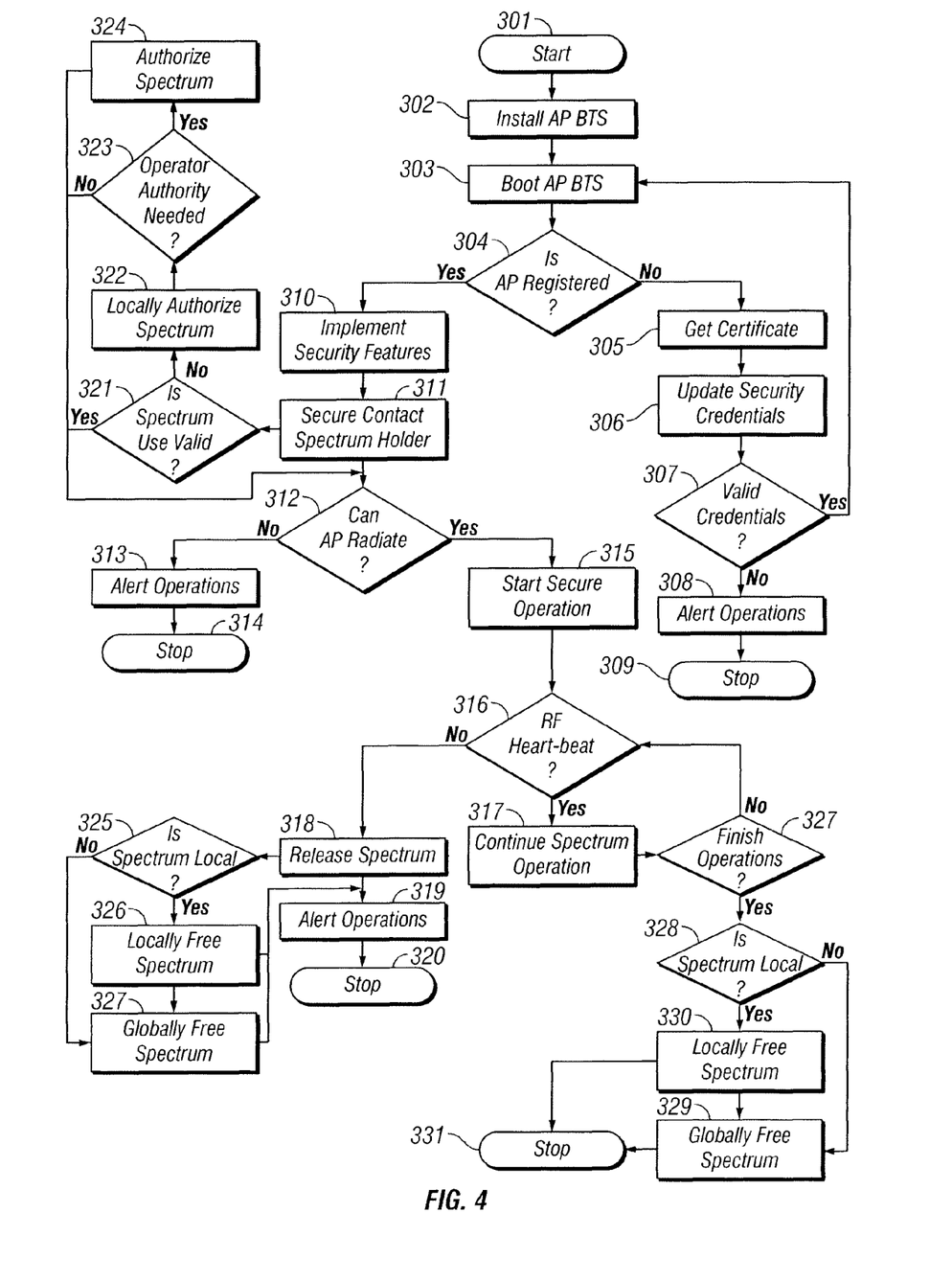
FIG. 4 is a flow diagram illustrating a system of operation of an embodiment of the invention.

FIG. 4 is a flow diagram illustrating an exemplary system of operation of an embodiment of the invention. In this embodiment, system operations begin 301 with computerized activities such as provisioning parameters and manual activities such as unpacking the equipment. In step 302, the system is installed. This installation may also comprise both computerized activities such as updating databases with parameters, collating provisioning information (e.g. location), and manual activities such as connecting physical interfaces to networks. In various embodiments, the physical installation may comprise distributing a plurality of femtocells throughout an area to be covered. Accordingly, such physical installation may comprise preplanning available system redundancy so that lease allocation may be better used to provide more efficient system operation. For example, redundant femtocells may be located at an airport baggage claim, and lease parameters may be provided as to allow multiple femtocells to be activated during arrival of an airplane, when system load is likely to increase.

In some embodiments, the lease acts as a constraint on the femtocells' behavior. Additionally, a central manager, such as the LSSC, may craft the leases according to a desired system operation. For example, the leases may be dependent on internal and external factors. As an example of an internal factor, a system having a plurality of femtocells might be experiencing a typical amount of system load and may desire to distribute the system load amongst the femtocells. Accordingly, the leases or constraints used might comprise leasing each femtocell with a disjoint proportion of available physical channels. For example, in a CDMA scheme this might comprise assigning each femtocell a disjoint partition of available coding vectors, while in an FDMA scheme this might comprise assigning each femtocell a disjoint subset of available frequencies. Accordingly, in these examples, system load is distributed amongst overlapping femtocells; moreover, because of some or all of the constraint parameters are unique to each femtocell, this distribution is dependent on the parameters leased to the other femtocells. In some embodiments, the dependence of one femtocell lease on the characteristics of another femtocell lease may allow system resources to be distributed efficiently without significant amounts of central planning. In the disjoint frequency example, if system load increased in the vicinity of one femtocell then assigning that femtocell more frequencies would also result in assigning another femtocell less frequencies. Accordingly, in this embodiment the spectrum use in the multiple femtocell coverage zone will automatically adapt to provide efficient coverage. As another example, under high system load this disjoint behavior might be changed to adapt to the high loading requirements. For example, some codes might be shared by two femtocells where both femtocells are experiencing high system load. Although this might increase the chances of having interfering transmissions, this might be mitigated in some embodiments by using the lease to reduce the power level of one the femtocells.

In other embodiments, the lease constraints might be used to adapt to an external factors. For example, one portion of a multi-femtocell coverage zone might experience higher than normal interference conditions from outside the coverage zone. The femtocell experiencing this high interference could be provided with a lease that authorizes it to transmit at a higher than normal power level to compensate for this interference. In these embodiments, the dependent nature of the leasing procedures may result in the femtocells immediately surrounding the interfered-with femtocell reducing their power level in response to the interfered-with femtocell's increase. This dependency both prevents the surrounding femtocells from contributing to the excess interference and allows the femtocell network as a whole to more efficiently allocate its transmission levels. In some systems, where the number of femtocells may reach into the hundreds or thousands or more, this ability to avoid central planning when compensating for internal or external conditions may save significant amounts of computational and communication bandwidth.

In step 303, the femtocells are started; and in step 304 the femtocell is authenticated and checked against a list of authorized nodes. This process is usually computerized and involves multiple steps including amongst others femtocell polling of the central controller or cellular system manager or the controller auto-discovering the femtocell. This step also involves a subset or the whole of the processes shown in step 307 for successful operation, with the difference being that successful operation leads to further processes rather than going back to previous process steps. This step usually also encompasses unique addressing of the femtocell so that it can be contacted directly during operations. In other implementations, this addressing step can occur in other steps such as steps 310, 305 to 307, or 303. Placement of the addressing is driven by a mixture of operational and security requirements.

If the access point is not registered, then the node is not recognized and the system proceeds to updating it authentication and authorization parameters in step 305. This step involves a stage where the node has a simple, but effective security check, based for example upon its MAC address or another hard to replicate or globally unique identifier that is available in the node. In the illustrated embodiment, the controller then presents a certificate of authentication to the node.

Once the certificate of authentication is received, it is parsed and the security information is stored 306 as the nodes credentials. In some embodiments, this step involves using a secure transaction method that only a valid node can parse. In these embodiments, this may help prevent rogue nodes from being maliciously placed within the femtocell network and accessing services and the cellular network.

In some embodiments, a re-authentication step 307 may be employed to check the credentials parsed from the secure information delivered from the controller. In these embodiments, if re-authentication step 307 verifies node authentication, then the node may be rebooted and passed back to step 303. In alternative embodiments, methods for skipping the re-authentication step might be employed, for example by setting a flag or parameter, thereby leading into step 303 to expedite process flows and save the time lost to a reboot process.

In step 308, if the femtocell has failed to present valid credentials then the node may be programmed to alert a supervisor or operator, for example, via a computer message or with a visual indication such as a flashing light. If the events described in 308 occur, then in some embodiments the system may halt operations 309. In some embodiments, methods for preventing an unauthorized node to frequency attempt authorization may be employed to maintain system resources. For example, some embodiments may utilize a step counter that increments and then resets the operation back to step 301, with cessation of operations if the step counter passes a threshold value.

In the illustrated embodiment, the node may be configured to implement various security features in step 310. Various embodiments may utilize a number of methods to secure the media and control traffic that passes over the node. Additionally, a security process may log the different methods used and allow an audit of the security. In various embodiments, the security features can be adapted for individual flows attributed to an attached mobile station or individual processes within the node or specific commands or requirements. Further embodiments may employ the various means of access and compliance with various regulatory requirements, such as lawful interception. Furthermore, this node the specific security implementation may be utilized as an alternative to bulk security when the flows are aggregated. In further embodiments, the security methods are applicable to media (useful data payload) as well as control messages. Security mechanisms in these embodiments may be applied to any mixture of separate or integrated control and media messages, as is often termed in-band or out-of-band control planes. In these embodiments, the security features may be encrypted using well known methods in the art—for example IPSec, SSL, TLS, DTLS, cellular encryption methods or emerging encryption methods using the credentials passed during earlier steps. At this stage, after the femtocell has been activated, its identity has been established, it has been authorized as a qualified operational node, and its security systems have been implemented, the femtocell is ready to begin operations. In some embodiments, under this security architecture, all subsequent steps can operate in a secure fashion so that messages cannot be intercepted or spoofed without constant reauthorization. In embodiments requiring secure addressing, the secure addressing may be implemented in this stage In step 311 the femtocell begins procedures to join the cellular communications system. For example, the femtocell may use the security signaling channel to request permission to use the licensed cellular spectrum band. In some embodiments, this step will comprise transmitting credentials and parameters, such as location and end-user identity. After the cellular system manager has processed these messages, a return message with parameters will be transmitted back to the femtocell. In some embodiments, this step may employ IP methods such as RADIUS, DIAMETER or cellular methods using SS7. In further embodiments, to increase the system integrity, the messages are encrypted such that they cannot be intercepted or spoofed. This secure contact with the spectrum holder may occur in series or in parallel according to the operational processes being as described herein.

In step 312, the return message that was transmitted from the spectrum holder, proxy, or cellular network manager is analyzed. In some embodiments, this evaluation may comprise establishing that participation in the cellular communication system is allowed, and if so, establishing what constraints the participation is under.

If the femtocell is not allowed to transmit or receive within the cellular communication system, the femtocell may alert 313 the operator and shutdown 314. As described herein, it may not be uncommon for a femtocell to not receive permission at this step. For example, the femtocell may be a redundant femtocell according to the deployment of a plurality of femtocells within a coverage area. Accordingly, this step may further comprise instituting a self-timing feature that allows the femtocell to periodically check if it should participate in the cellular network In step 315, the femtocells begin secure operations. The security architecture remains intact and the information passed from the licensed spectrum owner or proxy is interpreted. In some embodiments, the operation procedures might comprise operating for a time period determined by a lease provided by a system manager. In further embodiments, the operational procedures might further comprise operating at reduced power levels to prevent overlap of multiple femtocells' coverage ranges; operating using various sub-bands of the available licensed spectrum; or operating under any other characteristics established by a lease provided by the cellular system control. In further embodiments, communications may be encrypted according to the methods described herein. In still further embodiments, a return message may comprise a lease timer and the communications may take place only for the amount of time described in the lease timer.

Systems operations may further comprise performing a node heartbeat 316 that may comprise a periodic check that the parameters of operations established by the system control are being followed, for example as short as on a per millisecond basis, for example, the node may determine if its lease-timers, state monitor, network integrity, user behavior etc conform to the operational parameters as set forth herein. In some embodiments, the heartbeat procedure 316 may precede and follow continuation of normal operations 317 until the operations have terminated 327. In some embodiments, the communication system comprises an active two-way communication system and the broadcast channel (system to mobile device) and uplink channel (mobile device) are monitored constantly. Accordingly, the system operator, manager, or controller may be periodically polled during this operation such that the system may adapt to real-time events. In further embodiments, the normal operations may also comprise various reporting procedures that assist in system wide operation. For example, if a plurality of femtocells are in a master/slave relationship, such as described above with respect to FIG. 2, normal operations for slave femtocells may comprise transmitting reporting messages indicating their compliance or noncompliance with various parameters and constraints established by a lease.

In the illustrated embodiment, if the constraints placed upon the femtocell by the system are not met, the femtocells may take action to release its allocated spectrum portion and notify the licensed spectrum holder. In serial or parallel with this spectrum release, the system may alert the systems operator 319 to the impending shutdown and then shutdown 320. As described herein, this shutdown may also comprise maintaining some level of activity for periodic determinations if communication activities should resume.

Various embodiments of the invention may employ multi-level architectures. For example, a controller or group of controllers, as described herein, may be assigned the right to use a spectrum by a licensed spectrum holder. For example, an office building may be assigned a certain portion of the communication channels provided by a cellular communications system. The office building that may contain a plurality of control, for example one on each floor, and may decide to further partition some portion of the spectrum to amongst the various controllers and femtocells controlled thereby. Accordingly, in such architectures, the femtocells may receive leases from the controllers themselves and if those leases are violated rather than returning the spectrum to the spectrum owner, the spectrum is returned to the lessor, i.e. the femtocell controller. For example, the femtocell may have a lease timer that covers a long time period or multiple events and as such may be allocated a pool of frequencies that can be used on a need basis. In this instance, the question of validity of spectrum use would pertain to local parameters and would preclude a step going back to the original licensed spectrum owner either directly or via an intermediary. Step 322 illustrates procedures to be followed if this multilevel architecture had been implemented. In this case the licensed spectrum switch controller (LSSC) would go through the steps to assign a frequency/channel or part of the spectrum. It would undertake the steps required to sub-lease the spectrum perhaps to the licensed spectrum access point (LSAP) for rapid reboot, decrement the frequency usage counter etc. In some embodiments, a controller receives the return of a portion of the spectrum under its control, which the controller may redistribute the spectrum to the remainder of the devices under its control. For example, this may allow the controller to rebalance the system according to prevailing conditions. For example, steps may be undertaken to release the spectrum back to the operator across one or more LSAP nodes. This step does not preclude the operator from instantly reauthorizing the usage, but allows for different parameters and oversight to be imposed by the spectrum owner. Retuning of the system is a likely outcome and the LSSC is responsible for maintaining system performance during this step (e.g., by shifting load between access points and maintaining end-user satisfaction with the system). Both steps 326 and 327 may occur without user knowledge or input. This change can autonomous, according to a policy set by the spectrum owner when the lease was obtained or according to a predefined feedback loop that connects to the operator upon this event, cause etc. the event/cause etc can be from the broadcast leg (system to mobile device) or from the uplink (mobile device to system).

In further embodiments, the portion of the spectrum made available by the station of operations by the femtocell may be required to be returned 323 to the spectrum owner. For example, this determination may be based on the operation factors and parameters decided between the two entities. In some embodiments, this determination can be contractual, operational or a mixture of both.

In step 324, the system operator decides whether to grant the request for a spectrum allocation. The spectrum operator's response may comprise the lease granted to the femtocell system. For example, the response may comprise a grant of that spectrum plus a policy for usage and triggers upon which the sub-system is to comply with. This may include maximum limits on transmission power or other femtocell configuration constants. The operator may in the response request a complete system rebalance to meet their national/international lawful conditions or regulations. This would cause codependent LSAPs to be operationally changed as the spectrum owner has oversight above, and beyond the location/sub-location of the system.

Figure 5:
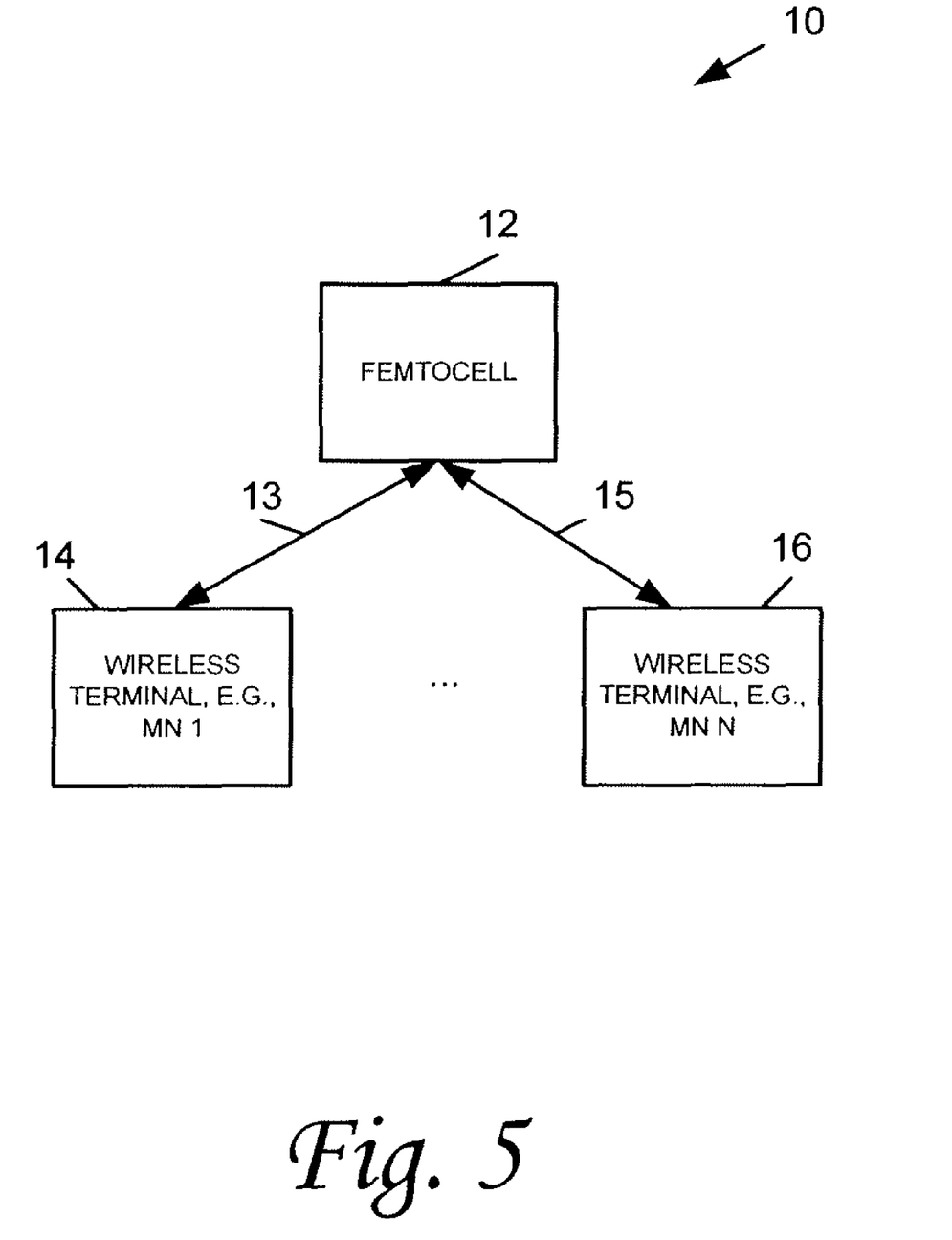
FIG. 5 illustrates a communications system implemented in accordance with an embodiment of the invention.

FIG. 5 illustrates a communications system implemented in accordance with an embodiment of the invention. In the system 10, multiple wireless terminals, e.g., mobile nodes MN 1 (14) through MN N (16) communicate with the femtocell 12 through the use of communication signals 13, 15. While shown as exemplary mobile nodes, the wireless terminal may also include stationary devices. The femtocell 12 may be, e.g., any one of femtocells 103-1 through 103-n. Each mobile terminal may correspond to a different mobile user and are therefore sometimes referred to as user terminals. The signals 13, 15 may be, e.g., CDMA or OFDM signals. The femtocell 12 and mobile stations 14, 15 each implement the method of the present invention. Thus, signals 13, 15 include signals of the type discussed above, which are transmitted in accordance with the invention.

Figure 6:
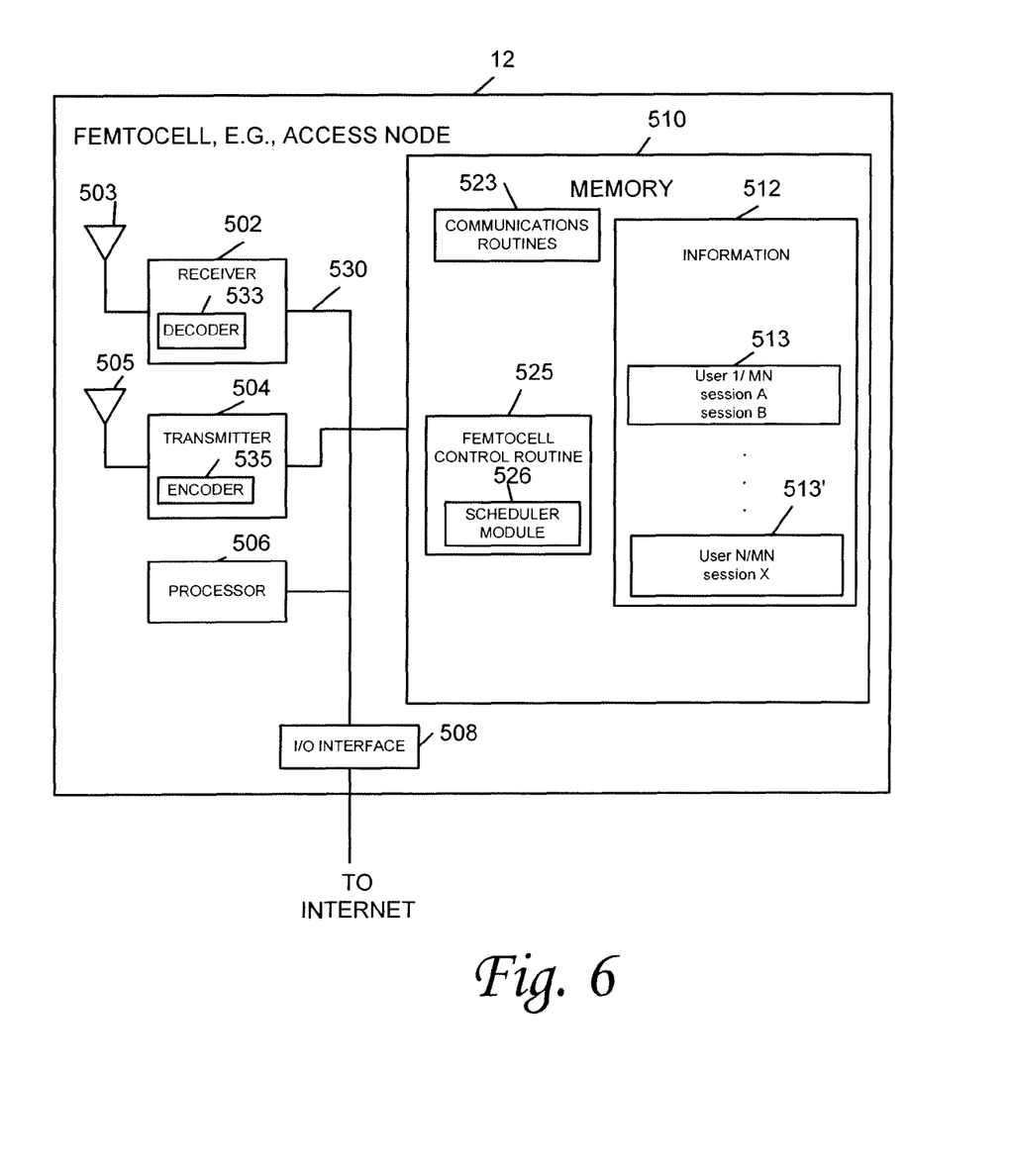
FIG. 6 illustrates an exemplary access router according to an embodiment of the invention.

FIG. 6 illustrates an exemplary access router according to an embodiment of the invention. The femtocell 12 includes antennas 503, 505 and receiver transmitter circuitry 502, 504. The receiver circuitry 502 includes a decoder 533 while the transmitter circuitry 504 includes an encoder 535. The circuitry 502, 504 is coupled by a bus 530 to an I/O interface 508, processor (e.g., CPU) 506 and memory 510. The I/O interface 508 couples the femtocell 12 to the IP network or licensed spectrum switch controller 102. The memory 510 includes routines, which when executed by the processor 506, cause the femtocell 12 to operate in accordance with the invention. Memory includes communications routines 523 used for controlling the femtocell 12 to perform various communications operations and implement various communications protocols. The memory 510 also includes a femtocell control routine 525 used to control the femtocell 12, these femtocell control routines may be used to perform the various methods of operation of embodiments of the invention described herein. The femtocell control routine 525 includes a scheduling module 526 used to control transmission scheduling or communication resource allocation. Thus, module 526 may serve as a scheduler. Memory 510 also includes information used by communications routines 523, and control routine 525. The information 512 includes an entry for each active mobile station user 513, 513' that lists the active sessions being conducted by the user and includes information identifying the mobile station (MT) being used by a user to conduct the sessions.

Servers or host devices may be implemented using circuitry which is the same as, or similar to, the circuitry of the exemplary access router shown in FIG. 4 but with interfaces or control routines suited to, e.g., which implements the particular server/host device's requirements. The control routines or hardware in such servers or hosts cause the devices to implement the above described methods.

Figure 7:
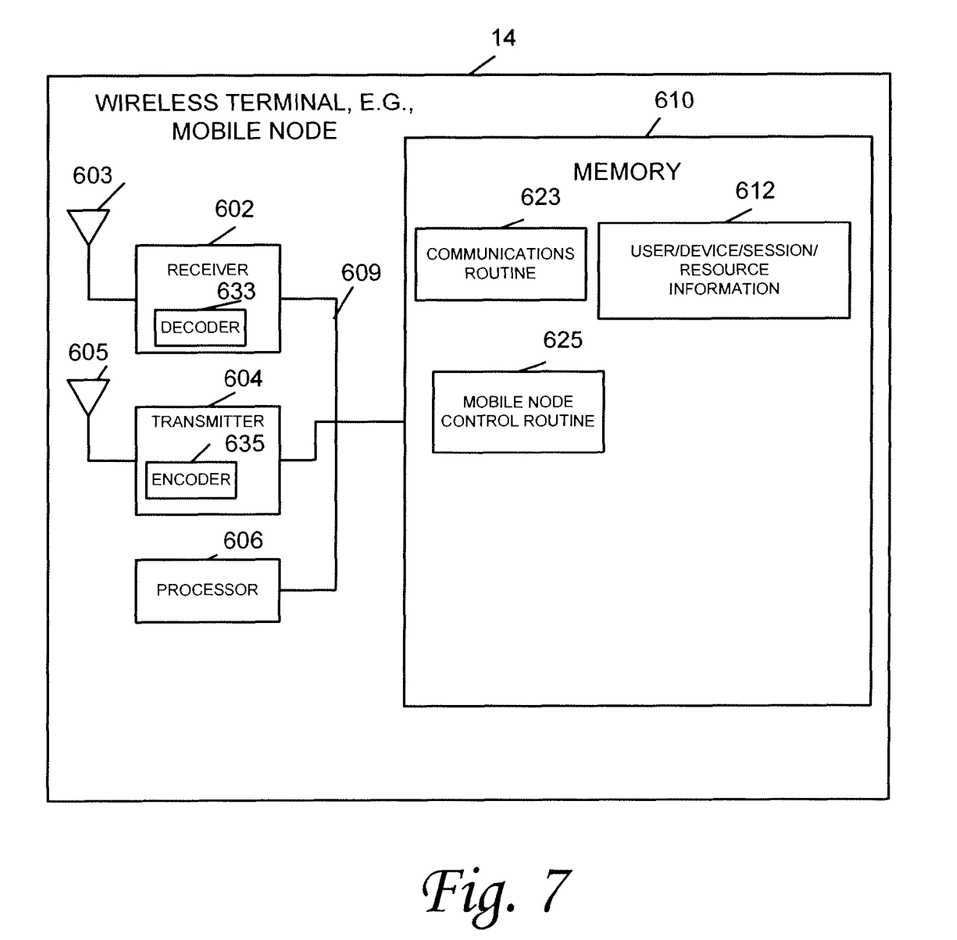
FIG. 7 illustrates an exemplary mobile node according to an embodiment of the invention.

FIG. 7 illustrates an exemplary mobile node according to an embodiment of the invention. The mobile node 14 may be used as a mobile terminal (MT). The mobile node 14 includes receiver and transmitter antennas 603, 605, which are coupled to receiver and transmitter circuitry 602, 604 respectively. The receiver circuitry 602 includes a decoder 633, while the transmitter circuitry 604 includes an encoder 635. The receiver transmitter circuits 602, 604 are coupled by a bus 609 to a memory 610. Processor 606, under control of one or more routines stored in memory 610 causes the mobile node 14 to operate in accordance with the methods of the present invention as described above. In order to control mobile node operation memory includes communications routine 623, and mobile node control routine 625. The mobile node routine is responsible for insuring that the mobile node operates in accordance with the methods of the present invention and performs the steps described above in regard to mobile node operations. The memory 610 also includes user/device/session/resource information 612, which may be accessed and used to implement the methods of the present invention or data structures used to implement the invention.

The techniques of various embodiments may be implemented using software, hardware or a combination of software and hardware. Various embodiments are directed to apparatus, e.g., mobile nodes such as mobile access terminals, base stations including one or more attachment points, or communications systems. Various embodiments are also directed to methods, e.g., method of controlling or operating mobile nodes, base stations or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

In various embodiments, nodes described herein are implemented using one or more modules to perform the steps corresponding to one or more methods, for example, determining as a function of proximity to a location of interest if a change condition used to trigger a change from a first transmit peer discovery mode to a second transmit peer discovery mode has occurred, transitioning from the first transmit peer discovery mode to the second transmit peer discovery mode, communicating location information to a server, communicating information corresponding to a location of interest to a server, downloading a location of information list from a server, measuring power of a received signal, estimating proximity to a location of interest, etc. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications device, including a processor configured to implement one, multiple or all of the steps of one or more methods of the invention.

Some embodiments are directed to a computer program product comprising a computer-readable medium comprising code for causing a computer, or multiple computers, to implement various functions, steps, acts or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts or operations of one or more methods described above. Accordingly, some embodiments are directed to a processor, e.g., CPU, configured to implement some or all of the steps of the methods described herein. The processor may be for use in, e.g., a communications device or other device described in the present application.

In some embodiments, the processor or processors, e.g., CPUs, of one or more devices, e.g., communications devices such as wireless terminals are configured to perform the steps of the methods described as being as being performed by the communications device. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software or hardware.

At least some of the methods and apparatus of various embodiments are applicable to a wide range of communications systems including many OFDM as well as non-OFDM or non-cellular systems.

Figure 8:
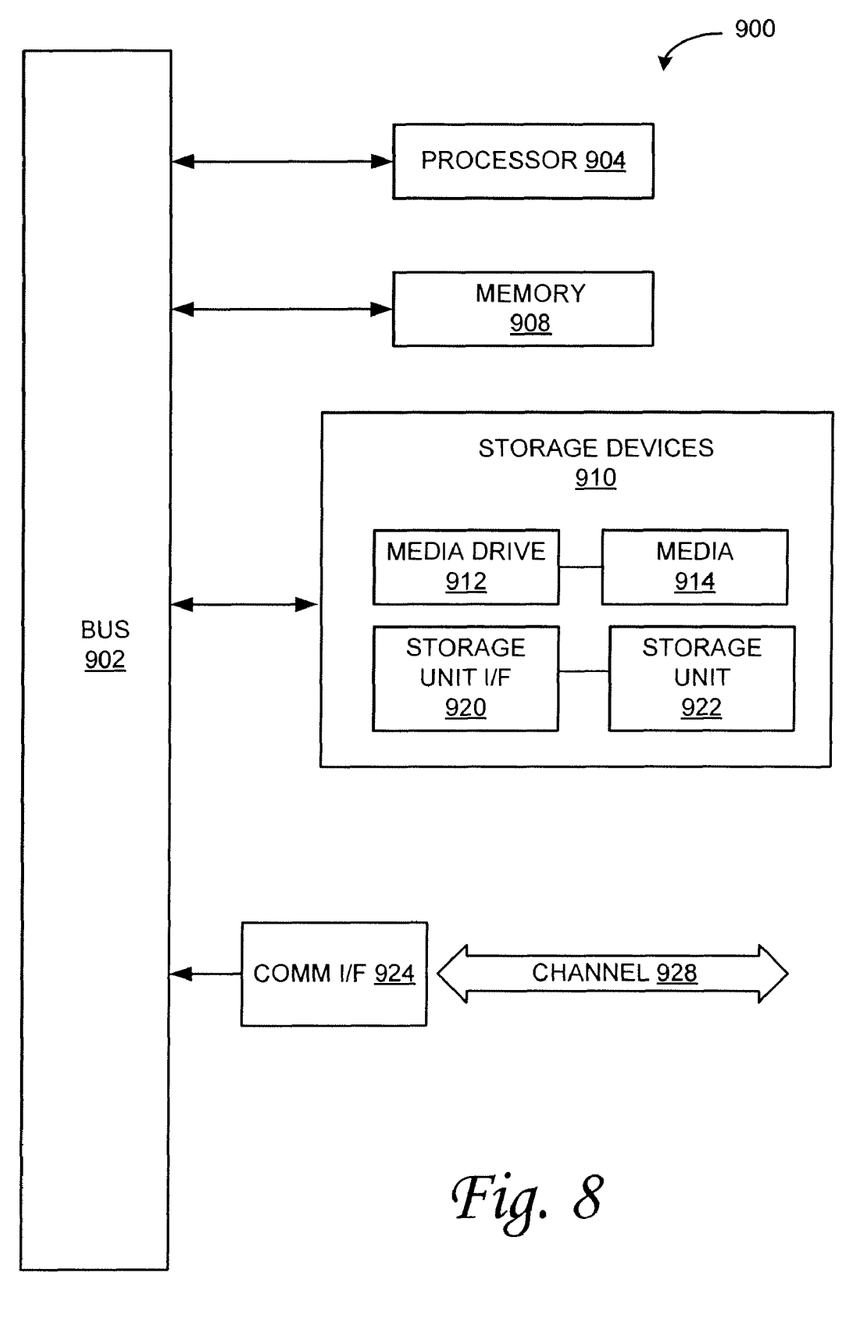
FIG. 8 illustrates an example computing module that may be used in implementing various features of embodiments of the invention.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), or various other types of communications techniques which may be used to provide wireless communications links between access nodes and mobile nodes. In some embodiments the access nodes are implemented as base stations which establish communications links with mobile nodes using OFDM or CDMA. In various embodiments the mobile nodes are implemented as notebook computers, personal data assistants (PDAs), or other portable devices including receiver/transmitter circuits and logic or routines, for implementing the methods As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 8. Various embodiments are described in terms of this example-computing module 900. After reading this description, it will become apparent to a person skilled in the relevant art how to implement the invention using other computing modules or architectures.

Referring now to FIG. 8, computing module 900 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 900 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 900 might include, for example, one or more processors, controllers, control modules, or other processing devices, such as a processor 904. Processor 904 might be implemented using a general-purpose or special-purpose processing engine such as, for example, a microprocessor, controller, or other control logic. In the illustrated example, processor 904 is connected to a bus 902, although any communication medium can be used to facilitate interaction with other components of computing module 900 or to communicate externally.

Computing module 900 might also include one or more memory modules, simply referred to herein as main memory 908. For example, preferably random access memory (RAM) or other dynamic memory, might be used for storing information and instructions to be executed by processor 904. Main memory 908 might also be used for storing temporary variables or other intermediate information during execution of instructions to be executed by processor 904. Computing module 900 might likewise include a read only memory ("ROM") or other static storage device coupled to bus 902 for storing static information and instructions for processor 904.

The computing module 900 might also include one or more various forms of information storage mechanism 910, which might include, for example, a media drive 912 and a storage unit interface 920. The media drive 912 might include a drive or other mechanism to support fixed or removable storage media 914. For example, a hard disk drive, a floppy disk drive, a magnetic tape drive, an optical disk drive, a CD or DVD drive (R or RW), or other removable or fixed media drive might be provided. Accordingly, storage media 914 might include, for example, a hard disk, a floppy disk, magnetic tape, cartridge, optical disk, a CD or DVD, or other fixed or removable medium that is read by, written to or accessed by media drive 912. As these examples illustrate, the storage media 914 can include a computer usable storage medium having stored therein computer software or data.

In alternative embodiments, information storage mechanism 910 might include other similar instrumentalities for allowing computer programs or other instructions or data to be loaded into computing module 900. Such instrumentalities might include, for example, a fixed or removable storage unit 922 and an interface 920. Examples of such storage units 922 and interfaces 920 can include a program cartridge and cartridge interface, a removable memory (for example, a flash memory or other removable memory module) and memory slot, a PCMCIA slot and card, and other fixed or removable storage units 922 and interfaces 920 that allow software and data to be transferred from the storage unit 922 to computing module 900.

Computing module 900 might also include a communications interface 924. Communications interface 924 might be used to allow software and data to be transferred between computing module 900 and external devices. Examples of communications interface 924 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 924 might typically be carried on signals, which can be electronic, electromagnetic (which includes optical) or other signals capable of being exchanged by a given communications interface 924. These signals might be provided to communications interface 924 via a channel 928. This channel 928 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 908, storage unit 920, media 914, and channel 928. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 900 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of operating a femtocell control module in control of a femtocell, the method comprising:
   transmitting a request to operate the femtocell to an external control system;
   receiving a response from the external control system, where the response comprises an operational constraint on the femtocell; and
   causing the femtocell to conduct cellular communications according to the operational constraint, wherein the femtocell control module is further in control of a plurality of other femtocells, and the plurality of other femtocells are also caused to conduct cellular communication according to the operational constraint, the operational constraint being based upon lease terms imposed on the femtocell by the external control system.

2. The method of claim 1, wherein the operational constraint comprises a femtocell transmission power constraint, a femtocell transmission frequency constraint, a femtocell transmission time period constraint, or a femtocell transmission direction constraint.

3. The method of claim 1, wherein the external control system comprises a cellular system management system.

4. The method of claim 1, wherein the external control system comprises a second femtocell control module.

5. The method of claim 1, wherein the step of causing the plurality of other femtocells to conduct cellular communication according to the operational constraint comprises determining femtocell-specific constraints for femtocells of the plurality of other femtocells such that aggregate femtocell behavior does not violate a predetermined system behavior.

6. The method of claim 5, wherein a first operational constraint given to a first femtocell is at least partially dependent on a second operational constraint given to a second femtocell.

7. The method of claim 5, further comprising:
   determining if a first femtocell of the plurality ceases cellular communications; and
   re-determining the femtocell-specific constraints for the femtocells of the plurality of other femtocells excluding the femtocell that ceased communications.

8. The method of claim 7, further comprising causing the first femtocell to cease cellular communications if the first femtocell violates its femtocell-specific constraints.

9. The method of claim 7, further comprising the first femtocell ceasing its own cellular communication if it determines that is has violated its femtocell- specific constraints.

10. The method of claim 1, further comprising causing at least one of the femtocell and the plurality of other femtocells to conduct cellular communications according to at least one constraint based upon at least one lease term imposed on the femtocell by the external control system.

11. A femtocell control module embodied as a non-transitory computer-readable medium having computer executable program code embodied thereon, the computer executable program code configured to cause the femtocell control module to perform the steps of:
   transmitting a request to operate a femtocell under its control to an external control system;
   receiving a response from the external control system, where the response comprises an operational constraint on the femtocell;
   causing the femtocell to conduct cellular communications according to the operational constraint, wherein a plurality of other femtocells are also under control of the femtocell control module, and wherein the computer executable program code is further configured to cause the plurality of other femtocells to also conduct cellular communication according to the operational constraint, the operational constraint being based upon lease terms imposed on the femtocell by the external control system.

12. The method of claim 1, further comprising:
sending and receiving lease requests for itself and the plurality of other femtocells, the sending of the lease requests including transmitting operational information about itself and the plurality of other femtocells to the external control system, and the receiving of the least requests including at least one lease term based upon the transmitted operational information; and
further causing at least one of the femtocell and the plurality of other femtocells to conduct cellular communications according to the at least one lease term.

13. The method of claim 12, wherein the conducting of cellular communications according to the at least one lease term comprises ceasing cellular communications in at least one of the plurality of other femtocells in accordance with the at least one lease term.

14. The femtocell control module of claim 11, wherein the computer executable program code is configured to further cause the femtocell control module to perform the step of: causing at least one of the femtocell and the plurality of other femtocells to conduct cellular communications according to at least one constraint based upon at least one lease term imposed on the femtocell by the external control system.

15. The femtocell control module of claim 11, wherein a first operational constraint given to a first femtocell is at least partially dependent on a second operational constraint given to a second femtocell.

16. The femtocell control module of claim 11, wherein the operational constraint comprises a femtocell transmission power constraint, a femtocell transmission frequency constraint, a femtocell transmission time period constraint, or a femtocell transmission direction constraint.

17. The femtocell control module of claim 11, wherein the step of causing the plurality of other femtocells to conduct cellular communication according to the operational constraint comprises determining femtocell-specific constraints for femtocells of the plurality of other femtocells such that aggregate femtocell behavior does not violate the operational constraint.

18. The femtocell control module of claim 17, wherein the computer executable program code is further configured to cause the femtocell control module to perform the steps of:
determining if a first femtocell of the plurality ceases cellular communications; and
re-determining the femtocell-specific constraints for the femtocells of the plurality of other femtocells excluding the femtocell that ceased communications.

19. The femtocell control module of claim 14, wherein the computer executable program code is configured to further cause the femtocell control module to perform the steps of:
sending and receiving lease requests for itself and the plurality of other femtocells, wherein performing the sending of the lease requests includes transmitting operational information about itself and the plurality of other femtocells in the lease request to the external control system, and performing the receiving of the least requests including at least one lease term based upon the transmitted operational information; and
further causing at least one of the femtocell and the plurality of other femtocells to conduct cellular communications according to the at least one lease term.

20. The femtocell control module of claim 19, wherein the computer executable program code is configured to further cause the femtocell control module to perform the step of ceasing cellular communications in at least one of the plurality of other femtocells in accordance with the at least one lease term.

21. A femtocell configured to communicate with a femtocell control module, comprising:
a communications interface configured to receive control signals from the femtocell control module; and
a cellular access point module configured to conduct cellular communications activities in accordance with the control signals;
wherein the control signals are determined according to an operational constraint transmitted to the femtocell control module, and wherein the control signals determined according to the operational constraint transmitted to the femtocell further control cellular communications conducted by a plurality of other femtocells under control of the femtocell control module, the operational constraint being based upon lease terms imposed on the femtocell by the external control system.

22. The femtocell of claim 21, wherein a first operational constraint given to a first femtocell is at least partially dependent on a second operational constraint given to a second femtocell.

23. The femtocell of claim 21, wherein the femtocell further comprises the femtocell control module.

24. The femtocell of claim 21, wherein the femtocell control module is contained in a second femtocell and wherein the communications interface comprises a network channel.

25. The femtocell of claim 21, further comprising a policing module configured to deactivate the femtocell if the femtocell fails to operate according to the control signals.

26. The femtocell of claim 21, wherein the femtocell further comprises the policing module.

27. The femtocell of claim 21, further comprising a transmission module configured to transmit information to the femtocell control module to enable the femtocell control module to determine if the femtocell is operating according to the control signals.

28. The femtocell of claim 21, wherein the communications interface is further configured to receive additional control signals, and wherein the additional control signals are determined according to at least one constraint based upon at least one lease term imposed by an external control system.

29. The femtocell of claim 21, wherein the communications interface is further configured to receive additional control signals, and wherein the additional control signals are determined according to at least one lease term based upon operational information transmitted by the femtocell about itself and the plurality of other femtocells in a lease request sent to an external control system, such that the cellular access point module is further configured to conduct cellular communications for the femtocells and the plurality of other femtocells in accordance with the additional control signals.

30. The femtocell of claim 29, wherein, in accordance with the additional control signals, the cellular access point module is further configured to cease cellular communications activities in at least one of the plurality of other femtocells.

* * * * *